D. P. O'KEEFE.
TRAILER FOR AUTOMOBILES.
APPLICATION FILED APR. 9, 1918.

1,361,090.

Patented Dec. 7, 1920.

Inventor
D. P. O'Keefe
By F. Walsh
Atty.

UNITED STATES PATENT OFFICE.

DONALD PATRICK O'KEEFE, OF COFF'S HARBOUR, NEW SOUTH WALES, AUSTRALIA.

TRAILER FOR AUTOMOBILES.

1,361,090.  Specification of Letters Patent.  Patented Dec. 7, 1920.

Application filed April 9, 1918. Serial No. 227,500.

*To all whom it may concern:*

Be it known that I, DONALD PATRICK O'KEEFE, a subject of the King of Great Britain, residing at Coff's Harbour, in the State of New South Wales and Commonwealth of Australia, blacksmith, have invented new and useful Improvements in and Relating to Trailers for Automobiles, of which the following is a specification.

This invention relates to improvements in trailer attachments for motor vehicles and means for steering the same from the steering mechanism of the motor vehicle, and it consists in the combinations, constructions and arrangements hereinafter described and claimed.

One of the objects of the invention is to provide a trailer which may be attached to the chassis of an automobile so as to be drawn thereby, means being provided for turning the wheels of the trailer so as to steer the latter, such means being controlled from the steering gear of the automobile.

Another object of the invention is to provide flexible connections between the steering mechanism of the automobile and the steering means of the trailer, so that the automobile and trailer may move vertically relatively to each other without affecting said steering devices.

The invention is illustrated in the accompanying drawing, forming a part of this application, and in which—

Figure 1:
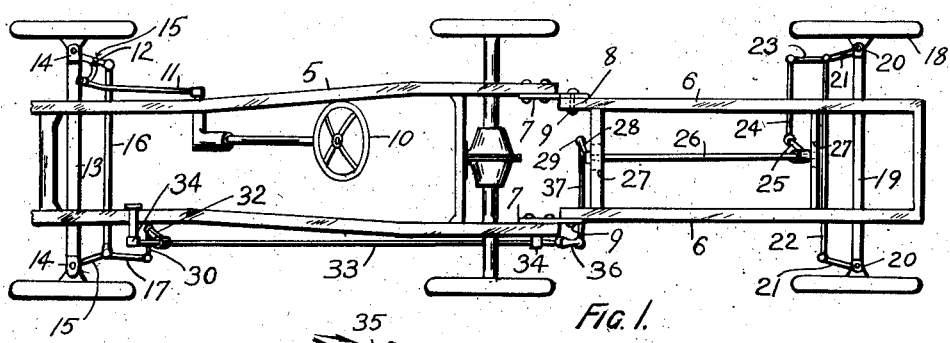
Figure 2:
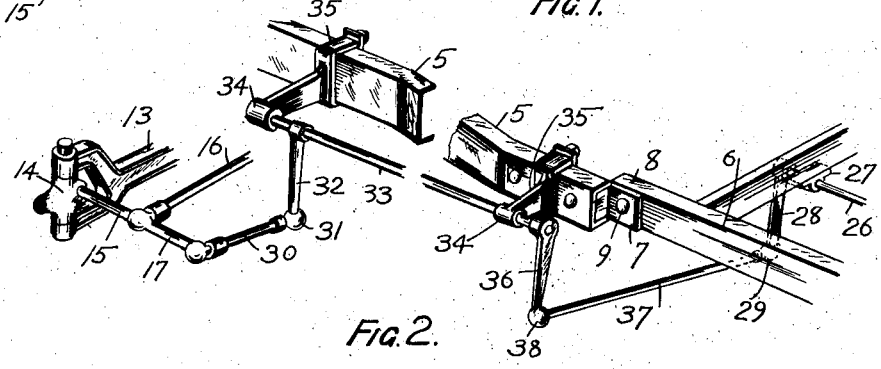
Figure 3:
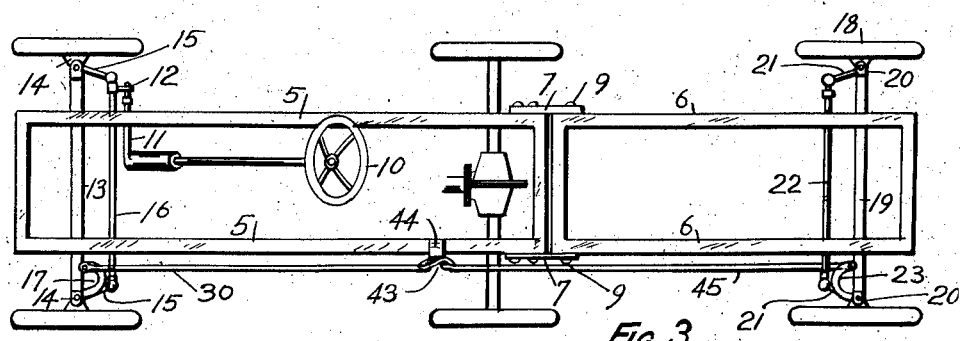
Figure 4:
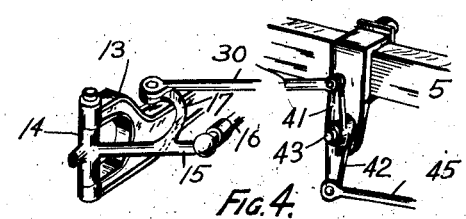

Figure 1 is a diagrammatic plan of a combination vehicle consisting of a draft or leader automobile and a trailer coupled together according to this invention. Fig. 2 is a fragmentary perspective view of the main parts of the connective mechanism and Figs. 3 and 4 are similar views of a similar though slightly different chassis and mechanical connections.

The leader chassis 5, of ordinary construction, has bolted or otherwise affixed at the rear end thereof extension pieces or brackets 7 with orifices adapted to take therein in axial line bolts or joint pins 9. The fore ends 8 of the trailer chassis 6 are complementary to the brackets 7 and also have orifices for said joint pins 9 so that the two parts of the combination vehicle may travel on the surface of the roadway independently of one another by rocking on said joint pins 9.

The leader chassis 5 has ordinary steering mechanism connected to the front axle 13 and operated as well understood by steering wheel 10 and mechanism in which by means of connecting rod 11 the desired movement is imparted to the operating arm 12 of the stub axles 14 joined together by radius arms 15 and connecting rod 16.

The trailer chassis 6 is supported more or less on the one pair of wheels 18 whose fast axle 19 is affixed to the side or other members of chassis 6 in any ordinary manner. This chassis 6 has steering mechanism consisting of radius arms 21, rigid with the stub axles 20 on which the wheels 18 are mounted, and one of these arms is integral with an operating arm 23. The radius arms 21 are connected for joint movement by a rod 22. This arm 23 is jointed to a connecting rod 24 whose other end is jointed to the rear one 25 of a pair of similar radius arms on a rocking spindle 26 in bearings 27 on convenient chassis members and the fore one 28 of which has a ball jointing at 29.

Reverting now to the steering mechanism of the leader chassis one of the stub axles has an operating lever 17 being an extension of a radius arm beyond the ball jointing to the connecting rod 16 and at its end this rod 17 is ball jointed to a connecting rod 30 whose other end is ball jointed at 31 to a radius arm 32 on a rocking spindle 33 in bearings 34 of brackets 35 clasped or otherwise affixed to convenient members of the chassis 5. The rear end of the rocking spindle 33 has a second and similar radius arm 36 connected by rod 37 having ball joints 38 and 29 the latter adapted to take in a complementary part on the fore radius arm as 28 of a rocking spindle as 26 on a trailer chassis as 6.

In the modified construction illustrated in Figs. 3 and 4 the steering mechanism of the fore wheels of the leader chassis and that of the wheels of the trailer chassis are similarly constructed as before described.

But in this case the operating arm 17 is forwardly instead of rearwardly of the front connecting rod 16 and of a consequence the operating arm 23 of the steering mechanism of the trailer chassis must be rearwardly instead of forwardly of the rear connecting rod 22. Otherwise the parts of the two steering mechanisms of this modification are the same and have similar functions to the similar parts described with reference to Figs. 1 and 2 and bear the same distinguishing numbers.

But this modification has different connective mechanism between the steering gear of the leader chassis 5 and the reverse steering gear of the trailer chassis 6. The operating arm 17 (forwardly pointing) has connecting ball joint to connecting rod 30 whose other end is jointed to one arm 41 of a two-arm lever mounted on pivot 43 on bracket 44 clipped or otherwise secured to the leading chassis frame. The other arm 42 of the two-arm lever is adapted to be jointed to a connecting rod 45 which rod is pivoted to the operating arm 23 (pointing rearwardly) of the reverse steering gear of the axle 19 of the trailer chassis 6.

What I claim is:—

The combination with an automobile, of a trailer pivotally connected with the chassis of the automobile to permit relative vertical movement of the automobile and trailer, said trailer having a pair of wheels, each of said wheels being mounted on a steering knuckle, and a common steering rod connecting said steering knuckles, a rock shaft disposed longitudinally of the trailer and provided with a plurality of extending arms, said shaft being of a length insufficient to extend beyond the front of the trailer, a radius rod fixed to one of said steering knuckles, a link connecting said radius rod to one of said arms, a second rock shaft carried by the automobile and provided with a plurality of fixed arms, a link connecting one of the arms of the second shaft to the other arm of the first shaft, and means connecting the other arm of the second shaft to the steering apparatus of the automobile.

In testimony whereof I have signed my name to this specification in the presence of two subscribing witnesses.

DONALD PATRICK O'KEEFE.

Witnesses:
 PERCY NEWELL,
 I. EASTON.